United States Patent [19]

Komori et al.

[11] E Re. 28,828

[45] Reissued May 25, 1976

[54] ELECTROPHOTOGRAPHIC COPYING DEVICE

[75] Inventors: Shigehiro Komori, Yokohama; Jiro Sato; Akira Kurahashi, both of Tokyo, all of Japan

[73] Assignee: Canon Kabushiki Kaisha, Tokyo, Japan

[22] Filed: Oct. 5, 1973

[21] Appl. No.: 404,122

Related U.S. Patent Documents

Reissue of:

[64] Patent No.: 3,614,220
Issued: Oct. 19, 1971
Appl. No.: 780,653
Filed: Dec. 3, 1968

[30] Foreign Application Priority Data

Dec. 11, 1967 Japan ..... 42-79376
Dec. 15, 1967 Japan ..... 42-105383

[52] U.S. Cl. ..... 355/8; 355/13; 355/29

[51] Int. Cl.[2] ..... G03G 15/00

[58] Field of Search ..... 355/8, 3, 13, 28, 29

[56] References Cited

UNITED STATES PATENTS

| | | | |
|---|---|---|---|
| 2,782,678 | 2/1957 | Taylor | 355/29 |
| 3,245,330 | 4/1966 | Okishima | 355/13 X |
| 3,445,160 | 5/1969 | Helland | 355/13 X |
| 3,468,605 | 9/1969 | Martin | 355/13 X |
| 3,493,299 | 2/1970 | Hazelton | 355/13 X |
| R27,700 | 7/1973 | Suzuki | 355/66 |

*Primary Examiner*—Monroe H. Hayes
*Attorney, Agent, or Firm*—Fitzpatrick, Cella, Harper & Scinto

[57] ABSTRACT

An electrophotographic copying machine using a roll of sensitive paper in which the original holder for carrying the original reciprocates on the machine case of the electrophotographic copying device. While the original holder is in its backward motion, the original is illuminated so as to subject the electrophotographic-sensitive paper to a slit exposure, and the copy is obtained through subsequent steps of developing and fixing. The reciprocating motion of the original is related to the paper feed so that the paper is cut to the length of the original. An indicator is provided for indicating the size of the roll of sensitive paper in the paper-feeding unit and for indicating the maximum size original capable of being copied.

4 Claims, 10 Drawing Figures

*INVENTOR.*
SHIGEHIRO KOMORI,
JIRO SATO and AKIRA
KURAHASHI

*BY* MARN & JANGARATHIS
Attorneys for Applicants

*INVENTOR*
SHIGEHIRO KOMORI,
JIRO SATO and AKIRA
*BY* KURAHASHI

MARN & JANGARATHS
Attorneys for Applicants

INVENTOR.
SHIGEHIRO KOMORI,
JIRO SATO and AKIRA
BY KURAHASHI

MARN & JANGARATHIS
Attorneys for Applicants

INVENTOR.
SHIGEHIRO KOMORI,
JIRO SATO and AKIRA
BY KURAHASHI

MARN & JANGARATHIS
Attorneys for Applicants

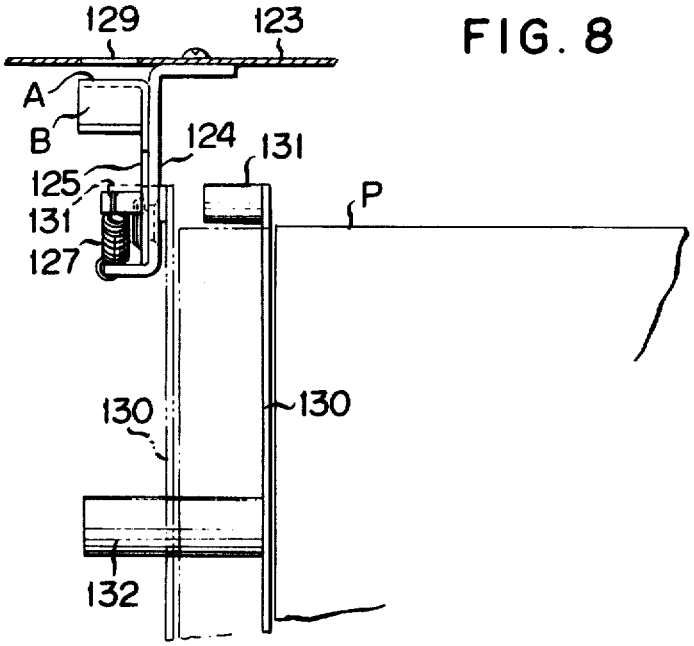
FIG. 8
FIG. 9
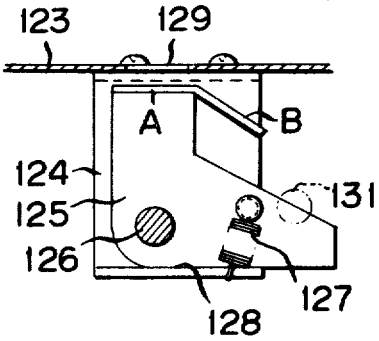
FIG. 10
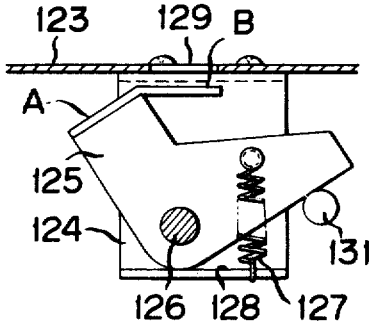

ELECTROPHOTOGRAPHIC COPYING DEVICE

Matter enclosed in heavy brackets [ ] appears in the original patent but forms no part of this reissue specification; matter printed in italics indicates the additions made by reissue.

This invention relates to a copying machine, and more particularly [ to ] *an embodiment of* an electrophotographic copying machine using a roll of sensitive *copy* paper *is disclosed herein in detail.*

Generally, originals to be copied by the copying machine are not necessarily fixed in size. There are used numerous sizes of originals such as, for example A4 size (nearest equivalent being "imperial octavo") measuring 21.0 cm. × 29.7 cm. and B5 size (nearest equivalent being "crown quarto") measuring 18.2 cm. × 25.7 cm. In order to copy such originals of varying sizes, the sensitive paper being supplied to the copying machine is required to have various sizes conforming to those of the originals. However, if sensitive papers of various sizes [ equaling ] *equal* to those of originals are to be prepared in advance in a copying machine, then the copying machine will have a complicated structure. Thus, there has been followed a practice whereby a stack of sensitive papers cut to a fixed size in advance is reserved in the sensitive-paper-feeding unit of the copying machine, so that originals having larger sizes than the fixed size of the sensitive paper are rejected as uncopiable while those having smaller sizes are used with marginal portions wasted. This method is optimal when the original has substantially the same size as that of the sensitive papers. Otherwise, sensitive papers must be used wastefully or originals having larger sizes must be rejected as uncopiable. According to another conventional method, a roll of continuous sensitive paper is disposed within a copying machine and, in the course of copying operation, the said sensitive paper is suitably cut by a cutting means to a size conforming to the size of the original to be copied. With this method, since the sensitive paper is cut according to the size of the original, there is involved no waste of sensitive paper. Therefore, the copying expense per copy is less than with the aforementioned method. Besides, no wasteful margin occurs in the sensitive paper after having been used. Thus, this method has certain advantages.

If this method is employed at all, however, it becomes necessary for the copying machine to be provided with a sensitive-paper-cutting means and a means capable of sensing the size of original being copied and then operating the cutting means accordingly. Structurally, the known machines are highly complicated and expensive. This is one shortcoming of this method.

The object of the present invention consists in eliminating this shortcoming by providing a means for cutting the roll of sensitive paper to the size of the field of the original being copied with the aid of an extremely simple mechanism.

Another object of this invention resides in providing a means so adapted that the sensitive-paper-cutting means is actuated by the movement of the original conveying element which makes a reciprocating movement to achieve exposure during the process of copying, whereby the size of the original can be sensed with extremely high accuracy and the sensitive paper is cut accordingly.

Still another object of the invention is to provide an extremely small electrophotographic copying machine which is possessed of charging, exposing, and developing means in addition to the sensitive-paper-cutting means which is actuated by the movement of the original conveying element designed to make reciprocating motion during the process of copying.

Yet another object of the present invention consists in providing a copying machine provided with a means for indicating the size of the roll of sensitive paper disposed in the sensitive feeding unit of the copying machine as well as a means for indicating the maximum size of original capable of being copied.

The aforementioned objects and other objects as well as advantages of the present invention are explained in detail by referring to pictorial embodiments of the invention.

The drawings, FIG. 1 through FIG. 10, represent one example in which the present invention is applied to an electrophotographic copying machine:

FIG. 8 represents a side view of the means illustrated in FIG. 7; and

FIG. 9 and FIG. 10 represent drawings of the operating condition of the means illustrated in FIG. 7.

Referring to these drawings, a detailed description is made of the present invention below.

Figure 2:
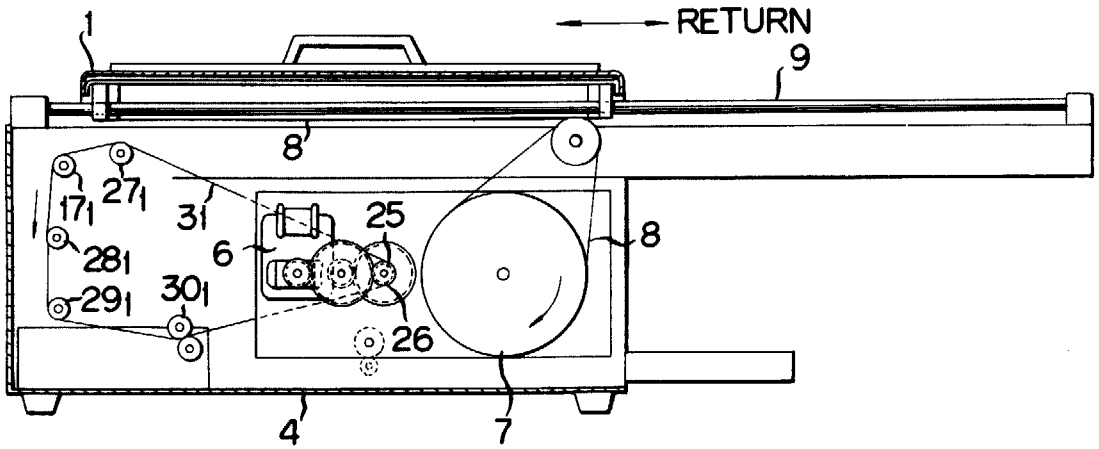
FIG. 2 represents a rear view illustrating the outline of the driving mechanism of the copying machine of FIG. 1.
Figure 3:
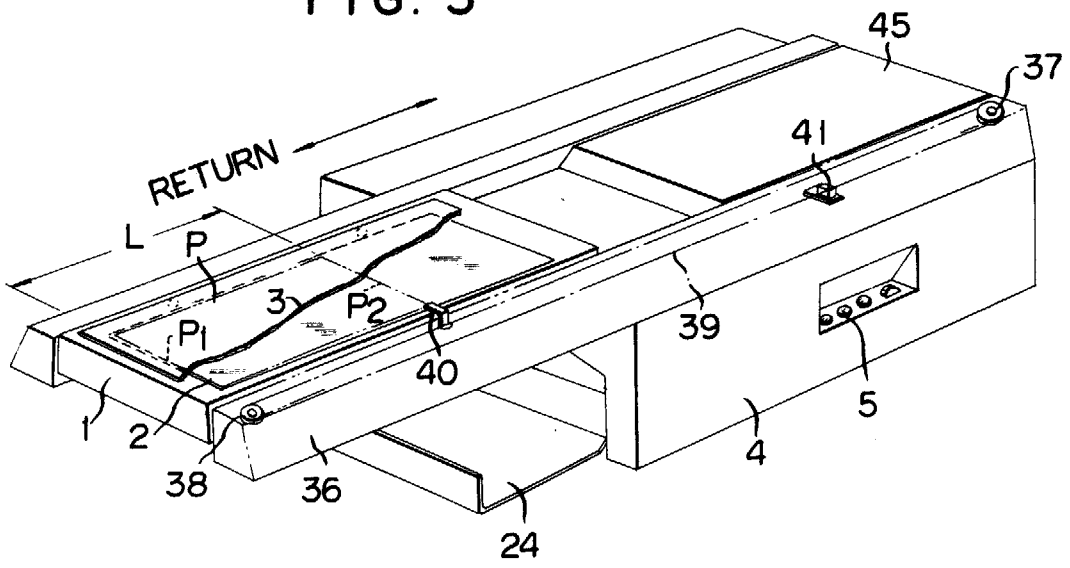
FIG. 3 represents a sketch drawing thereof.

First, one example *of an* electrophotographic machine suitable for applying this invention is outlined. As shown in FIG. 3, an original P is placed and held down by a rubber plate 3 on a glass plate 2 on an original holder 1 which is positioned to the left. A motor 6 begins to rotate as a start button 5 provided at a suitable position on a machine case 4 is depressed (FIG. 2), causing a pulley 7 to revolve in the direction opposite to an arrow mark (with the transmission system omitted from the drawing for the sake of clarity of illustration). Consequently, a belt 8 connected to both ends of the original holder 1 causes the original holder 1 to move along rails 9 from the left side of the machine case of FIG. 1 to the right position shown in FIG. 2. The end of the motion in that direction is sensed such as by means of a microswitch to cause the pulley 7 to move in the opposite direction. Consequently, the original holder is made to travel in the reverse direction and come to a stop at the position shown in FIG. 1 and FIG. 3, where the original is replaced. The end position of the forward motion or the starting position of the backward motion is always fixed correctly, while the end position of the backward motion or the starting position of the forward motion may be suitably selected as required.

When the aforementioned reverse motion starts, a lamp 10 (FIG. 1) is lit up to illuminate the original P from the lower surface with the aid of reflecting mirrors 11 and 12, whereby the image on the original is formed on an electrophotographic sensitive paper E travelling at the same speed as the reverse motion of the original at an exposing section 16 with the aid of an L-shaped mirror barrel 15 incorporating a reflecting mirror 13 and a lens 14. Thus, the slit exposure or scanning of the field of the original is effected.

The sensitive paper E from the roll is passed through cutters 32 and 33 with the aid of a feed roller 27. Generally since the paper is cut by the cutter, and at the same time the roller 27 comes to a stop, the leading end of the sensitive paper comes to a stop at the position cut by the cutter. During the forward motion of the original holder, the feed roller 27 and the subsequent feed roller system begin to rotate. Consequently, the sensitive paper E is led by the guide 60 to be engaged by the roller 17, then forwarded by the guide 61 to be electrically charged while passing through the charging section 18, and advanced by the feed roller 28 in the direction of the guide section of the exposing section 16.

The original holder reciprocating section and the paper feed driving section are interrelated with each other in such manner than the reverse motion of the original holder 1 starts when the leading end of the sensitive paper in motion begins to enter the effective image-forming position of the optical image in the exposing section 16.

The sensitive paper E having an electrostatic latent image formed thereon by the slit exposure effected in the manner just mentioned is passed through a liquid developer container 19 via the roller 29, advanced by the roller 56, and then transported by the conveyor 20 to the copy tray 24. In the meantime, the fan 21 draws the warm air from the vicinity of the lamp 10 and forwards it to the duct 22 and, if required, the current of warm air is heated by the heater 23 and is used for the purpose of fixing the powder image and drying the sensitive paper E.

In a copying machine of the construction mentioned, there is a large space between the L-shaped mirror barrel 15 and the electric charger 18. If this space is utilized for holding the roll of sensitive paper E to be supplied as required, then the mechanism will be simpler than the mechanism designed to pay off independent sheets of sensitive paper and the machine operation will be more reliable. If there is incorporated a means for cutting the sensitive paper to the size equaling the length of the original P being copied, waste of the sensitive paper can be saved.

The present invention is aimed at accomplishing this object. As illustrated in FIG. 3, an endless cord 39 is passed around the pulleys 37 and 38 on the machine case 4 parallel to the reciprocating direction of the original holder 1. On this cord 39 there is provided an index 40 which is manually set to the one end $P_2$ of the original P and a microswitch 41 which moves in the direction opposite thereto. The copying machine is constructed in such relationship that when one end $P_1$ of the original P is set to the standard or reference position, for example the rear end of the glass plate 2, on the original holder 1 and the index 40 is set to the other $P_2$ of the original P, the distance between the cam 42 (FIG. 4) provided on the original holder 1 and the microswitch 41, with the original holder 1 held at the end position of the forward motion or the starting position of the backward motion, will be equal to the length obtained by subtracting the distance between the cutters 32 and 33 and the entrance to the exposing section 16 from the length L of the original P.

Figure 1:
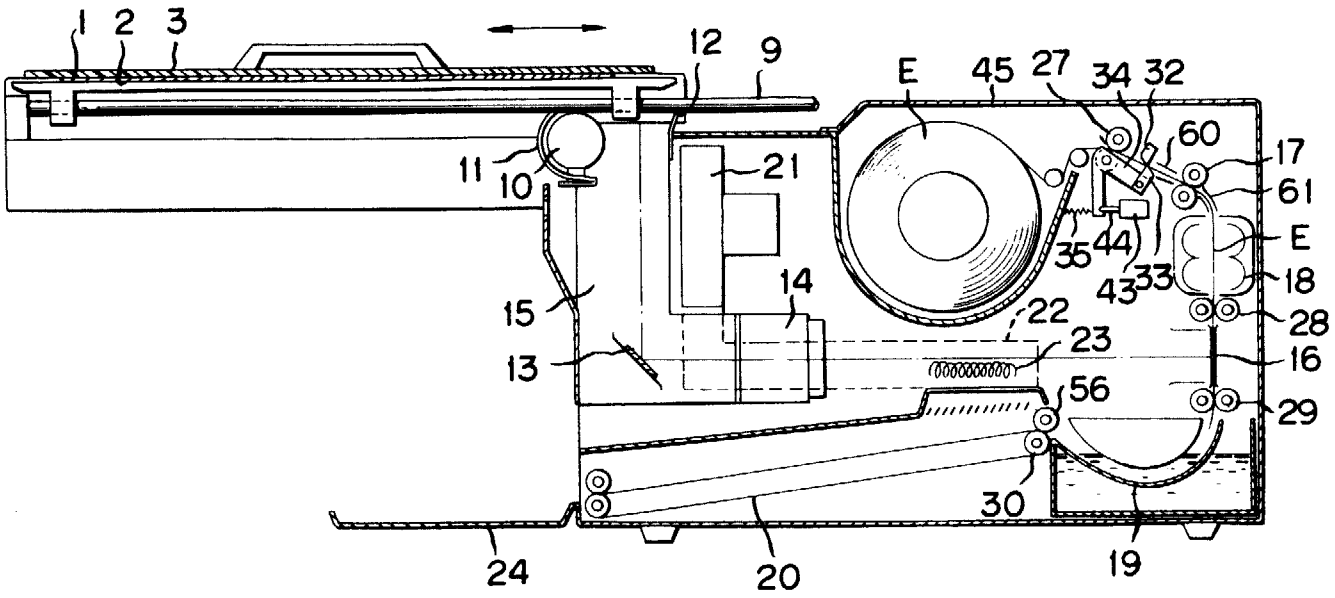
FIG. 1 represents a longitudinal sectional front view of the electrophotographic copying machine.
Figure 4:
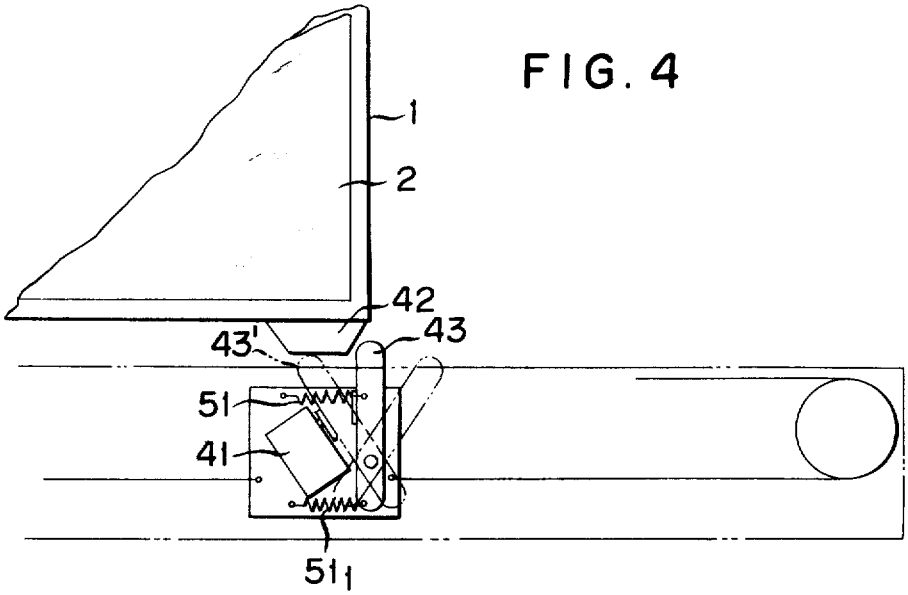
FIG. 4 represents an enlarged front view of the member for actuating the sensitive-paper-cutting means according to the present invention.

When the original holder 1 moves backward from the [ ends ] *end* position of the forward motion shown in FIG. 1 and, as a consequence, [ the cam 42 closes, ] through the aid of the lever 43, *the cam 42 closes* the microswitch 41 as shown in FIG. 4, the signal [ therefrom ] *from the microswitch* actuates an electrical control circuit so as to close the movable cutter 33 with reference to the stationary cutter 32 to cut the sensitive paper E and, at the same time, the feed roller 27 is isolated from the motive force side by means of a clutch to discontinue the paying-off motion of the sensitive paper E from the roll.

In short, while the original holder 1 is in its forward motion, the sensitive paper E is advanced from the position of the cutters 32 and 33; when the leading end of the sensitive paper reaches the immediate front of the entrance to the exposing section 16, the original holder 1 switches to the backward motion; and when the cam 42 closes the microswitch 41, the cutters 32 and 33 cut the sensitive paper to the length equaling that of the original, thus effecting the random length cutting.

Thereafter, the sensitive paper E is advanced by means of the rollers 17, 28, and 29–30, as will be described afterwards, at a speed equal to the speed of the original P with the backward motion of the original holder 1, then passed through the exposing section 16, the liquid developing section 19, the conveyor 20, and the hot-air drying and fixing section situated thereabove, and finally discharged into the tray 24.

Figure 6:
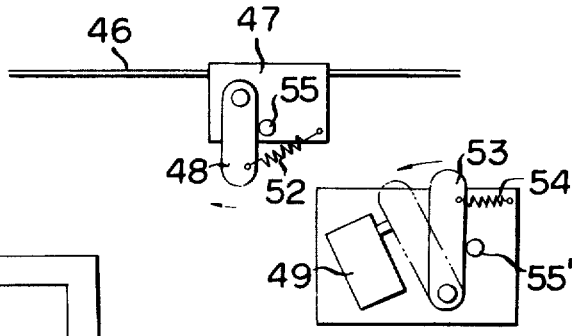
FIG. 6 represents a partially enlarged front view of the drawing of FIG. 5.
Figure 5:
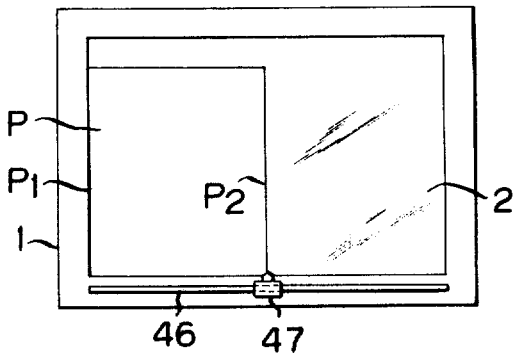
FIG. 5 represents a top view of one modified embodiment of the member for actuating the sensitive-paper-cutting means.

FIG. 5 and FIG. 6 represent, though with a different construction, the same device as described above. An index manually movable along a guide element or groove 46 provided on the original holder 1 is set so as to align with the end $P_2$ of the original P. On the index 47 is provided an operating member 48, which is so adapted that the distance travelled by the member 48, while being carried by the holder, after it reverses its course at the end position of the forward motion until it closes the microswitch 49 provided in fixed position on the machine case 4 will be equal to the length which is obtained by subtracting the distance between the cutters 32 and 33 and the entrance to the exposing section 16 from the length L of the original as in the previous example.

The operating member 48, and the cam 42 of FIG. 4 mentioned above actuate, the microswitches 41 and 49 only during the backward motion and not during the forward motion. For this purpose the device shown in FIG. 4 is provided with a lever 43 which is maintained in the neutral position by means of the springs 51 and $51_1$. This lever is pushed by the cam 42 away from the microswitch 41 while in the forward motion. During its backward motion, it is pushed by the cam 42 in such way as to close the microswitch 41. In the device of FIG. 6, the operating member 48 moves away against the spring 52 while in the forward motion, but it does push the lever 53 against the action of the return spring 54 so as to close the microswitch 49 while in the backward motion. The pins 55 and 55' serve as stops for the operating members 48 and 49, respectively.

For the sensitive paper feed rollers 27, 17, and 28–30, there may be used a suitable drive mechanism. In the case of the device illustrated, transmission wheels $27_1$, $17_1$, and $28_1$–$30_1$ shown in FIG. 2 are provided on the same axes as the rollers. These wheels are so arranged that they may be driven by a belt or chain 31 which is passed around a transmission gear 26 interlocked with the motor 6. In the space between the transmission wheel $27_1$ or its axis and the feed roller 27, there is provided a clutch (not shown in the drawing), which serves to cut the connection by means of the signal from the microswitch 41 or 49.

At the same time, this signal actuates an electrical control circuit with the result that the mechanical action or the action of the electromagnetic coil 43 (FIG. 1) will cause the plunger 44 to attract the lever 34 against the return spring 35, whereby the movable blade 33 fixed on the lever 34 will be closed against the stationary blade 32 to cut the sensitive paper E.

This invention is not limited to the copying machine having the components illustrated in FIG. 1, but may be applied to copying machines of any type possessed of an original holder adapted to make reciprocating motion and designed to effect slit exposure during such reciprocating motion. As used above it should be understood that the area copied may be only a portion or field of the original.

Now, a description is made of FIG. 7 through FIG. 10 which illustrate one example electrophotographic machines to which is applied the sensitive-size-indicating device of the present invention.

Figure 7:
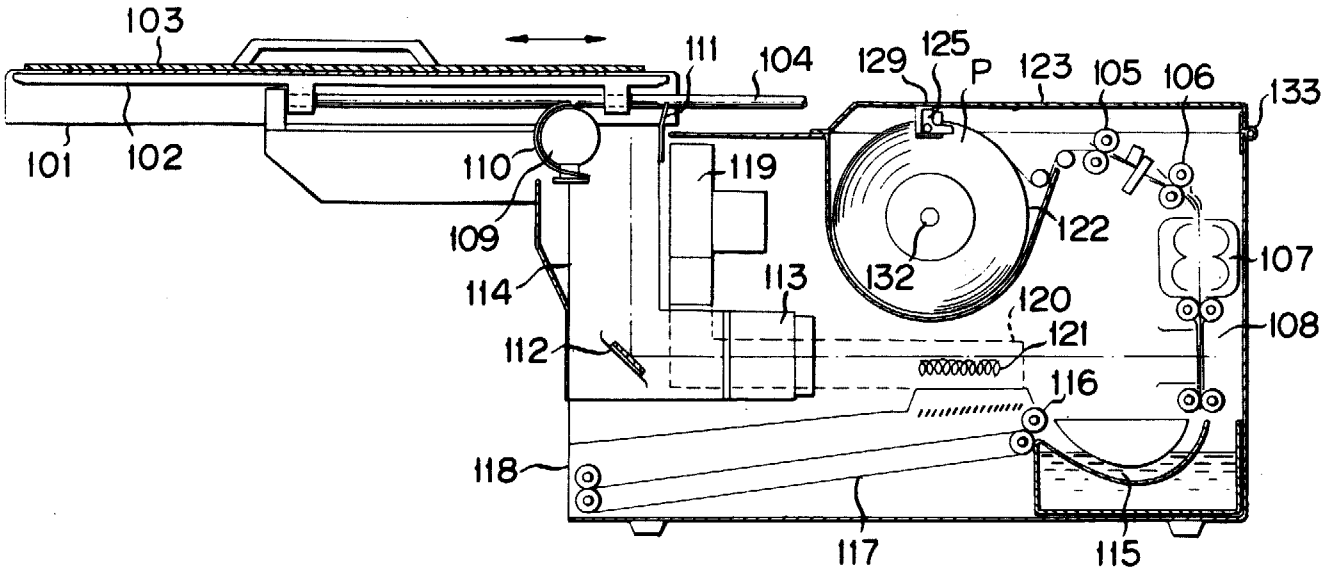
FIG. 7 represents a longitudinal sectional front view of an electrophotographic copying machine provided with a size indicating means according to this invention.

Referring to the diagram of FIG. 7, an original is placed on the glass plate 102 mounted on the original holder 101 positioned as illustrated, and it is held down by the rubber plate 103. Then, the original holder 101 is removed forward along the rail 104 to a fixed position on the right. In the meantime, the sensitive paper P is advanced by the rollers 105 and 106 through the corona-discharge charging unit 107 to the entrance of the exposing section 108.

Subsequently, the original holder 101 begins to make a backward motion and the lamp 109 is lit up to illuminate the original holder upwardly with the aid of reflecting mirrors 110 and 111, whereby the image is projected, via the L-shaped mirror barrel 114 consisting of a mirror 112 and a projecting lens 113, onto the sensitive paper P which is travelling in the exposing section 108 at the same speed as the original. Thus, the latent image is formed by slit exposure. Subsequently, the sensitive paper P is sent to the liquid developer container 115 to have the latent image developed into a visible image, passed through the squeezing rollers 116, and carried on the conveyor 117 as far as the outlet 118. In the meanwhile, the air in the vicinity of the lamp 109 is drawn by the fan 119 and delivered to the duct 120 and, if required, the current of heated air is heated by the heater 121 and blown on the paper. Thus, the fixing and drying are accomplished.

In copying machines of all types, including the slit exposure type involving the reciprocating motion of the original and the total-surface exposure type involving the use of an immobilized original, the sensitive paper P is reserved in the receptacle 122 of the paper feeding section and is protected against light by the shield 123. As the sensitive paper, the sheet type may be used instead of the roll type illustrated.

Generally, a copying machine is so designed that there can be used various sizes of sensitive paper P, such as A4 size and B4 size as already described. Accordingly, it is necessary to incorporate a means enabling the operator to know what size of sensitive paper is held in the receptacle without opening the case. This invention permits this indication to be accomplished automatically.

For this purpose, the present invention requires an indicator plate 125 to be set rotatably around the axis 126 on the support 124 which is disposed on the rear surface of the shield 123. The indicator plate is so adapted that it is usually drawn by the spring 127 to the extent of coming into direct contact with the stop 128, at which time "A" of the indicator surface A and B which forms an inseparable member with the indicator plate 125 will appear through the indication window 129 of the shield 123. And inside the sensitive paper receptacle 122, there is provided a regulating plate 130 serving to engage the side of the sensitive paper. On this regulating plate is provided a finger 131 against the indicator plate 125.

Now, if the regulating plate 130 is so designed that when sensitive papers of A size are placed in the receptacle, the regulating plate 130 will assume the position shown by the solid line in FIG. 8 and the finger 131 will not come into contact with the indicating plate 125, then the letter or sign in the A portion of the indicator plate 125 denoting A size will appear through the indication window 129 as illustrated in FIG. 3 when the shield 123 is placed on the receptacle. Then, when sensitive papers of B size are stored, the regulating plate 130 will move to the position indicated by a dash line in FIG. 8. When the shield 123 is closed, the indicating plate 125 comes into contact with the finger 131 and is pushed out as shown in FIG. 10, so that the B portion falls under the window 129 to permit the letter or sign denoting B size to be read through the window 129. It is also permissible to omit the aforementioned finger 131 and make the regulating plate 130 to function directly for this purpose.

Thus, the size of sensitive papers being stored can be indicated automatically by a very simple construction.

What is claimed is:

1. An electrophotographic copying device comprising in combination a reciprocally movable holder for supporting an original, said holder having a visible reference for locating relative thereto one edge of the area of an original to be copied, an adjustable index member positionable alongside said original adjacent the opposite edge of said area to be copied, means for holding a supply roll of copying material, electromechanical cutoff means, means for feeding said copying material from said roll over a predetermined path past said cutoff means to an exposure station including separate feed means located before and after said cutoff means, means operable while said holder is moving for projecting an image from an original supported on said holder upon said copying material as the latter passes through said exposure station, means for developing and fixing said image on said copying material after it is exposed, means for feeding said copying material from said exposure station through said developing and fixing means, switch means for controlling both said cutoff means and that feed means which is located before said cutoff means to simultaneously sever said copying material and interrupt the feeding of said material from said roll, and means interrelating said adjustable index nember with said switch means for causing said switch neans to be actuated after said holder has moved durng projection of said image a distance equal to the lifference between the length between said edges of aid area to be copied and the length of said predeternined path from said cutoff means to said exposure tation.

2. An electrophotographic copying device according o claim 1, wherein said means interrelating said adjustıble index member with said switch means comprises neans mounting both said index member and said ,witch means for movement along a path parallel to the ›ath of movement of said holder, a continuous belt nterconnecting said switch means with said index nember for reciprocal movement toward or away from :ach other, and a cam element carried by said holder 'or actuating said switch means as it moves past while ın image is being projected.

3. An electrophotographic copying device according :o claim 1, wherein said means interrelating said adjustıble index member with said switch means comprises neans mounting said index member on said holder for ıdjustable movement relative to said holder along a ›ath parallel to the path of movement of said holder, neans mounting said switch means adjacent the path of :ravel of said index member when the latter is carried ›y said holder during movement of the holder, and neans associated with both said index member and said switch means for actuating said switch means as it is passed by said index member while an image is being projected.

*4. An electrophotographic copying device comprising in combination a reciprocally movable holder for supporting an original, said holder having a visible reference for locating relative thereto one edge of the area of an original to be copied, an adjustable index member positionable alongside said original adjacent the opposite edge of said area to be copied, means for holding a supply roll of copying material, electromechanical cutoff means, means for forming on said copying material an image of said area to be copied, means for feeding said copying material from said roll over a predetermined path past said cutoff means to said image forming means including separate feed means located before and after said cutoff means, said image forming means including exposure means operable while said holder is moving for projecting an image from an original supported on said holder, for use in forming the image upon said copying material as the latter passes through said image forming means, switch means for controlling both said cutoff means and that feed means which is located before said cutoff means to simultaneously sever said copying material and interrupt the feeding of said material from said roll, and means interrelating said adjustable index member with said switch means for causing said switch means to be actuated after said holder has moved during projection of said image a distance equal to the difference between the length between said edges of said area to be copied and a predetermined length through which said copying material extends beyond said cutoff means at the commencement of said projection of said image.*

* * * * *